United States Patent
Chen et al.

(10) Patent No.: US 7,084,345 B1
(45) Date of Patent: Aug. 1, 2006

(54) SLIDE COVER UNIT

(75) Inventors: Yung-Chuan Chen, Taipei (TW); Chih-Hao Chang, Taipei (TW); Wei-Chih Chen, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

(21) Appl. No.: 11/269,718

(22) Filed: Nov. 9, 2005

(51) Int. Cl.
*H05K 5/03* (2006.01)

(52) U.S. Cl. ............... 174/52.1; 174/66; 361/752; 361/756; 455/575.4

(58) Field of Classification Search ............... 174/69, 174/52.1, 135; 455/550.1, 575.1, 575.4; 361/752, 756
See application file for complete search history.

(56) References Cited

U.S. PATENT DOCUMENTS

| | | | | |
|---|---|---|---|---|
| 4,425,725 A | * | 1/1984 | Moustakas et al. ........... | 174/66 |
| 5,973,241 A | * | 10/1999 | Tetsumura .................... | 84/179 |
| 6,831,229 B1 | * | 12/2004 | Maatta et al. .............. | 174/52.1 |
| 6,968,161 B1 | * | 11/2005 | Inomata et al. .......... | 455/575.4 |
| 6,973,186 B1 | * | 12/2005 | Shin ......................... | 455/575.4 |
| 6,975,889 B1 | * | 12/2005 | Chen et al. .............. | 455/575.1 |
| 6,980,840 B1 | * | 12/2005 | Kim et al. ............... | 455/575.4 |
| 7,002,073 B1 | * | 2/2006 | Lai et al. .................... | 174/52.1 |

* cited by examiner

*Primary Examiner*—Dean A. Reichard
*Assistant Examiner*—Adolfo Nino
(74) *Attorney, Agent, or Firm*—Troxell Law Office, PLLC

(57) ABSTRACT

A slide cover unit including: a substrate board formed with guide slots and slide rails, each guide slot being formed as a curved path with a ridge point; an upper cover having slide channels and formed with a transverse slot, the slide rails of the substrate board being slidably inlaid in the slide channels; and at least one resilient member having a fixed end fixed at an outer end of the slot and a free end equipped with a roller member. The roller member is slidably inlaid in the transverse slot and the guide slots. When the upper cover is moved, the roller member is moved along the transverse slot and guide slots to extend or compress the resilient member. When the roller member passes over the ridge point, by means of the resilient restoring force of the resilient member, the upper cover can further automatically move relative to the substrate board to complete opening/closing operation.

12 Claims, 10 Drawing Sheets

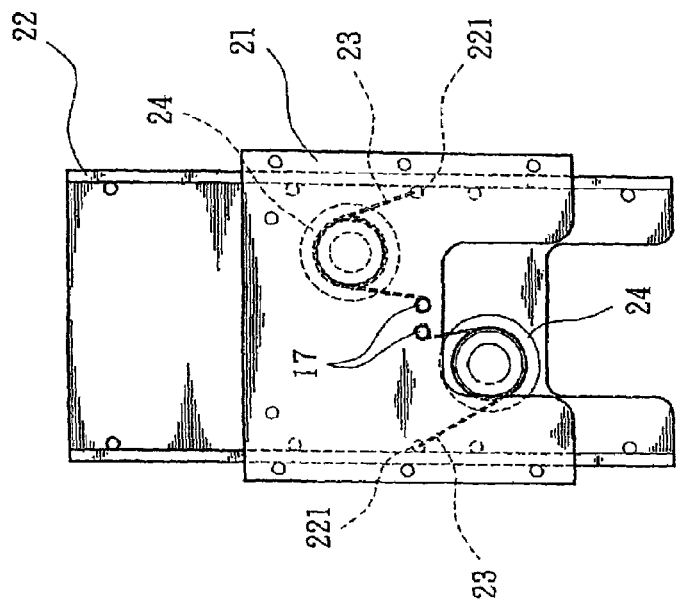
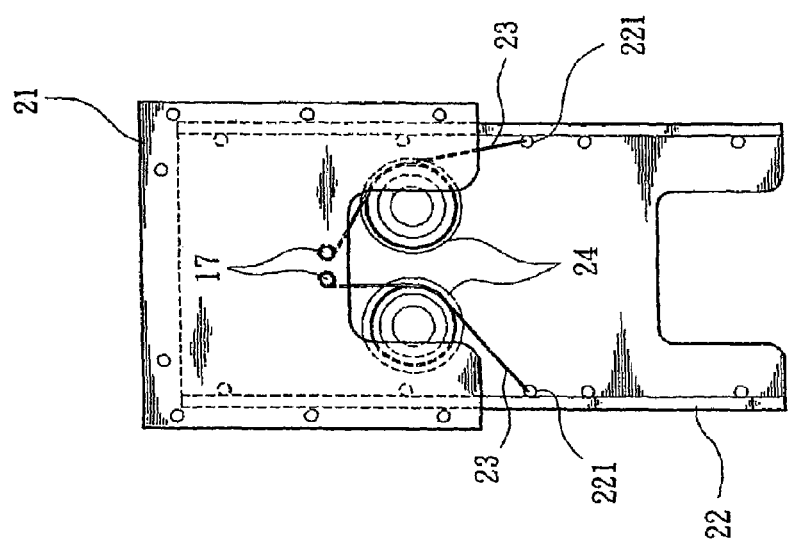
Fig. 7
Prior Art
Fig. 6
Prior Art

SLIDE COVER UNIT

BACKGROUND OF THE INVENTION

The present invention is related to an improved slide cover unit which is applicable to a small-size product. The slide cover unit has simple structure and can be smoothly opened/closed.

A mobile phone is often equipped with a slide cover unit for avoiding mis-touch of the keyboard and protecting the keyboard from being directly collided and damaged. FIGS. 1 and 2 show a typical slide cover unit including an upper cover 11, a substrate board 12, a torque spring 13, an arc restricting plate 14 and an extension spring 15. The upper cover 11 is formed with slide rails 113 slidably fitted on the substrate board 12. An upper face of the upper cover 11 is formed with a slot 111 and a sunk hole 112 communicating with the slot 111. One end of the extension spring 15 is fixed at a head end of the slot 111, while the other end of the extension spring 15 is connected with a roller 16 inlaid in the sunk hole 112. One end of the arc restricting plate 14 is connected with the roller 16. One end of the torque spring 13 is fixed on a fixing block 17.

One side of the substrate board 12 is formed with a fixing hole 121 in which the other end of the torque spring 13 is fixed. Two sides of the substrate board 12 are respectively formed with slide channels 122 in which the slide rails 113 are inlaid. The other end of the arc restricting plate 14 is disposed on one side of the substrate board 12 opposite to the fixing hole 121, whereby the arc restricting plate 14 can swing.

Referring to FIGS. 2 to 4, when the upper cover 11 moves downward by a travel, the arc restricting plate 14 swings downward as shown by phantom line of FIG. 3. At this time, the roller 16 is moved rightward and the extension spring 15 is extended to exert a pulling force onto the roller 16. The torque spring 13 is shifted and compressed (as shown by phantom line of FIG. 3) to conserve a resilient energy. Due to the elasticity of the torque spring 13, the upper cover 11 is kept in an upper position. However, when the fixing block 17 of the upper cover 11 passes over the level of the fixing hole 121, the torque spring 13 is further moved downward and restored from the compressed state into the original state (as shown by phantom line of FIG. 4). At this time, the resilient energy is released to move the upper cover 11 downward. Simultaneously, the arc restricting plate 14 swings downward and the extension spring 15 is compressed to locate the upper cover 11 in a lower position as shown in FIG. 4. The above structure is complicated and it is troublesome to assemble these components. As a result, the manufacturing cost is higher. Moreover, the complicated structure leads to enlarged volume and heavy weight.

FIGS. 5 and 6 show another type of conventional slide cover structure. The slide cover includes a substrate board 22, an upper cover 21 disposed on one side of the substrate 22, two springs 23 arranged between the upper cover 21 and the substrate 22 and two plastic boards 24 disposed on the springs 23 for reducing the friction between the springs 23 and the upper cover 21 and the substrate board 22. First ends of the springs 23 are respectively pivotally disposed in the holes 221 formed on two sides of the substrate board 22. Second ends of the springs 23 are pivotally disposed on fixing blocks 17 formed on the upper cover 21.

Referring to FIGS. 6 to 8, when the upper cover 21 is moved downward, as shown in FIG. 7, the springs 23 are moved downward and compressed to conserve resilient energy. At this time, according to the relationship between the positions of the fixing blocks 17 and the holes 221 of the substrate board 22, the upper cover 21 is still positioned in a buffering region. Due to the elasticity of the springs 13, the upper cover 21 is kept in an upper position. However, when the fixing blocks 17 of the upper cover 21 pass over the level of the fixing holes 221 (as shown in FIG. 8), the springs 13 are further moved downward and restored from the compressed state into the original state (as shown by phantom line of FIG. 8). At this time, the resilient energy is released to locate the upper cover 21 in a lower position as shown in FIG. 8. This structure is still complicated and it is troublesome to assemble these components. As a result, the manufacturing cost is still high. Moreover, practically, after a period of use, the springs 23 tend to deform or break.

SUMMARY OF THE INVENTION

It is therefore a primary object of the present invention to provide an improved slide cover unit including: a substrate board formed with guide slots and slide rails, each guide slot being formed as a curved path with a ridge point; an upper cover having slide channels and formed with a transverse slot, the slide rails of the substrate board being slidably inlaid in the slide channels; and at least one resilient member having a fixed end fixed at an outer end of the slot and a free end equipped with a roller member. The roller member is slidably inlaid in the transverse slot and the guide slots. When the upper cover is moved between two longitudinal ends of the substrate board, the roller member is moved along the transverse slot and guide slots to extend or compress the resilient member. When the roller member passes over the ridge point, by means of the resilient restoring force of the resilient member, the upper cover can further automatically move relative to the substrate board to complete opening/closing operation.

The present invention can be best understood through the following description and accompanying drawings wherein:

BRIEF DESCRIPTION OF THE DRAWINGS

FIG. 6 is a plane view according to FIG. 5;

FIG. 7 is a plane view according to FIG. 6, showing that the upper is moved downward;

DETAILED DESCRIPTION OF THE PREFERRED EMBODIMENTS

Figure 1:
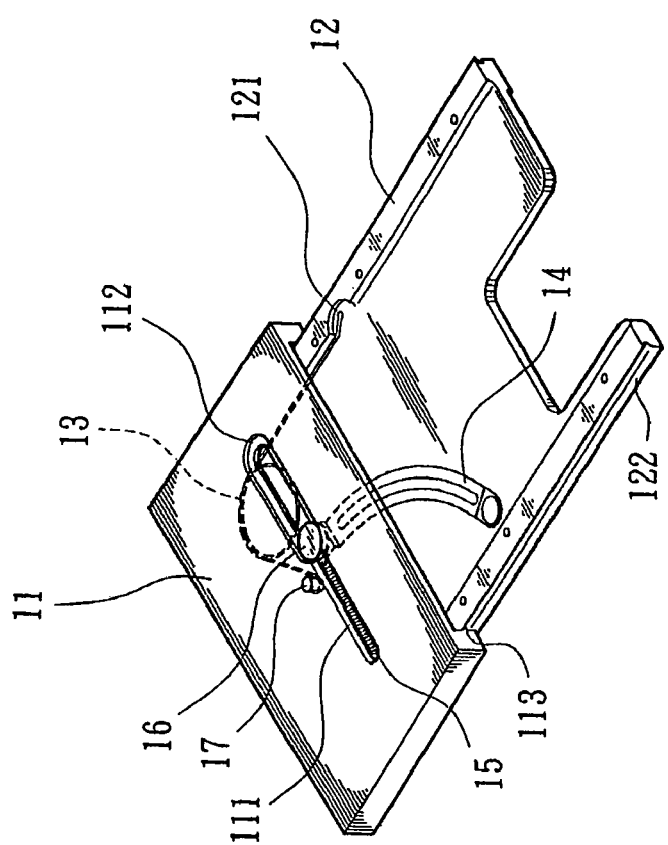
FIG. 1 is a perspective view of a conventional slide cover structure.
Figure 2:
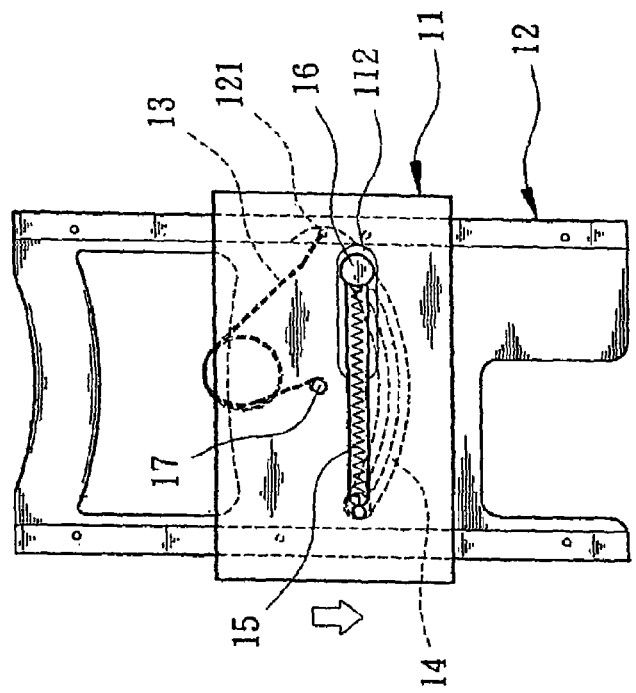
FIG. 2 is a plane view according to FIG. 1.
Figure 3:
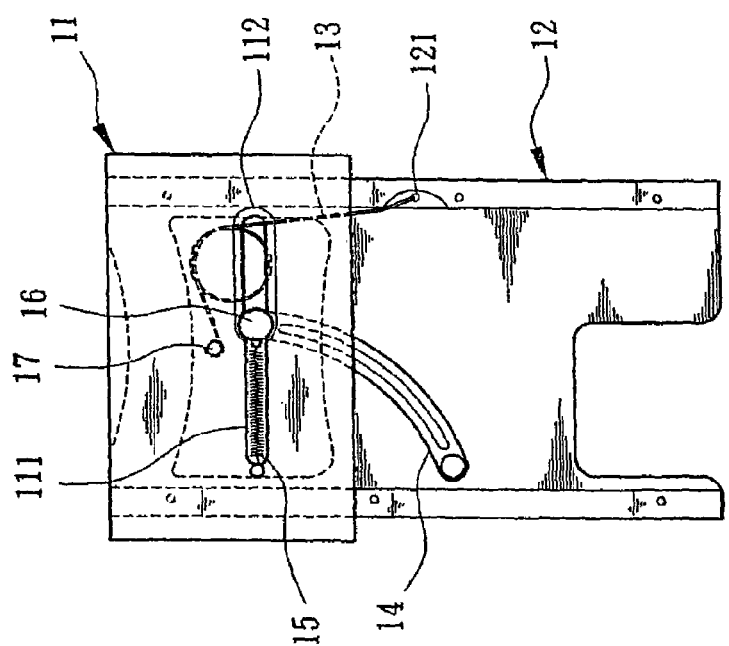
FIG. 3 is a plane view according to FIG. 2, showing that the upper is moved downward.
Figure 4:
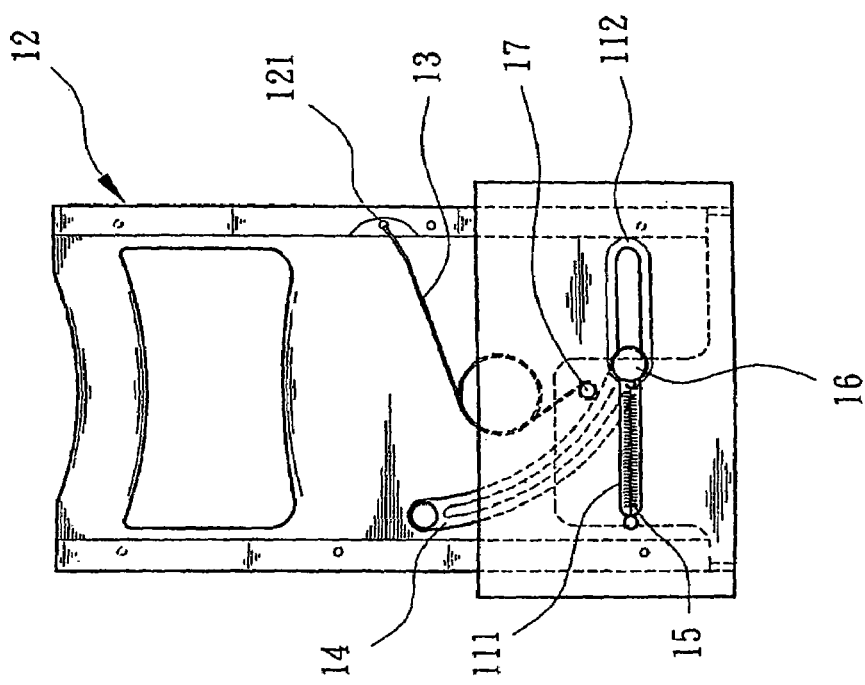
FIG. 4 is a plane view according to FIG. 3, showing that the upper is further moved downward.
Figure 5:
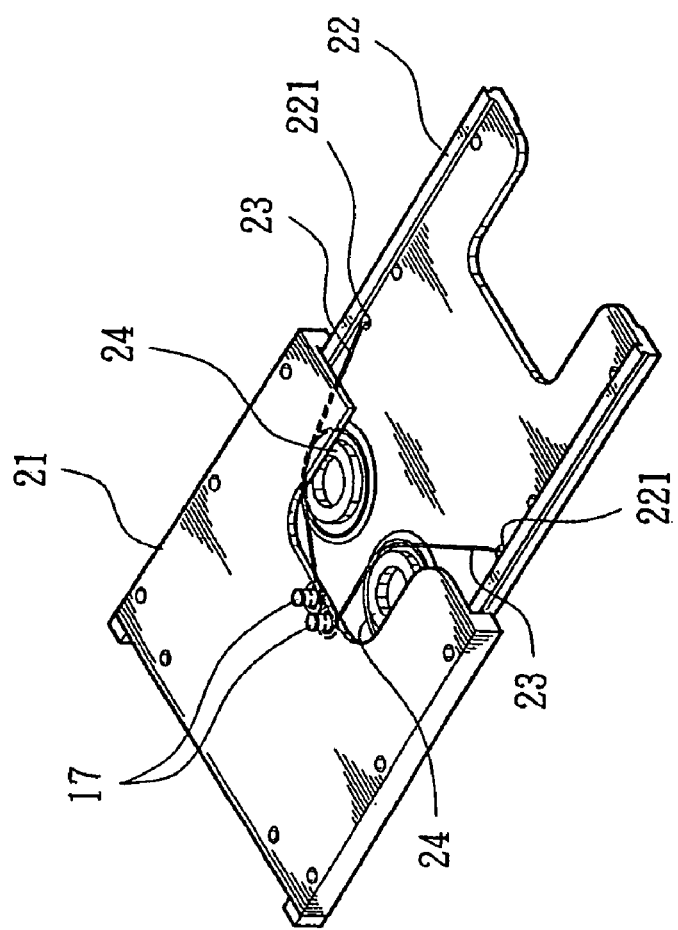
FIG. 5 is a perspective view of another type of conventional slide cover structure.
Figure 8:
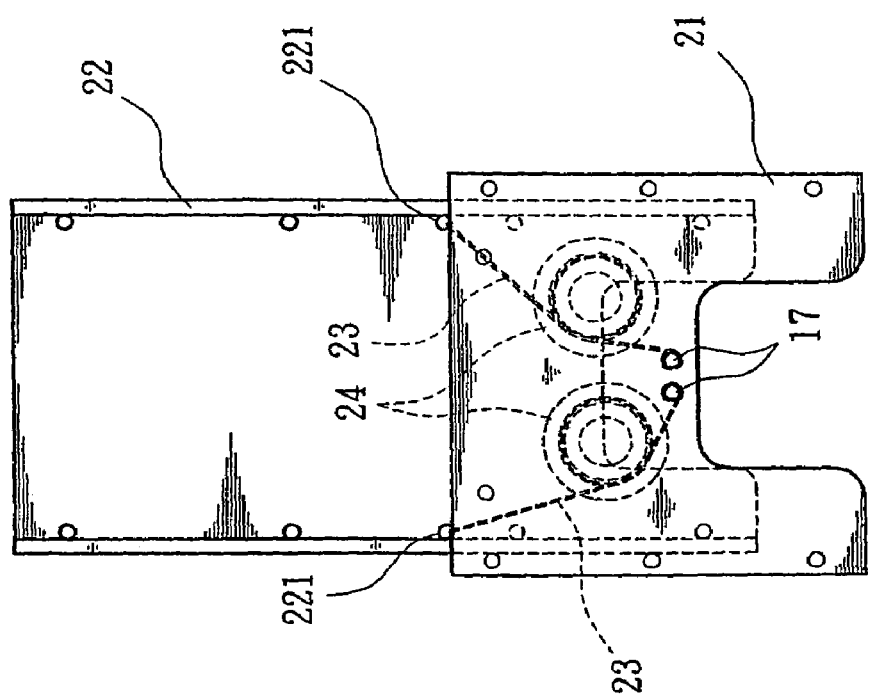
FIG. 8 is a plane view according to FIG. 7, showing that the upper is further moved downward.
Figure 9:
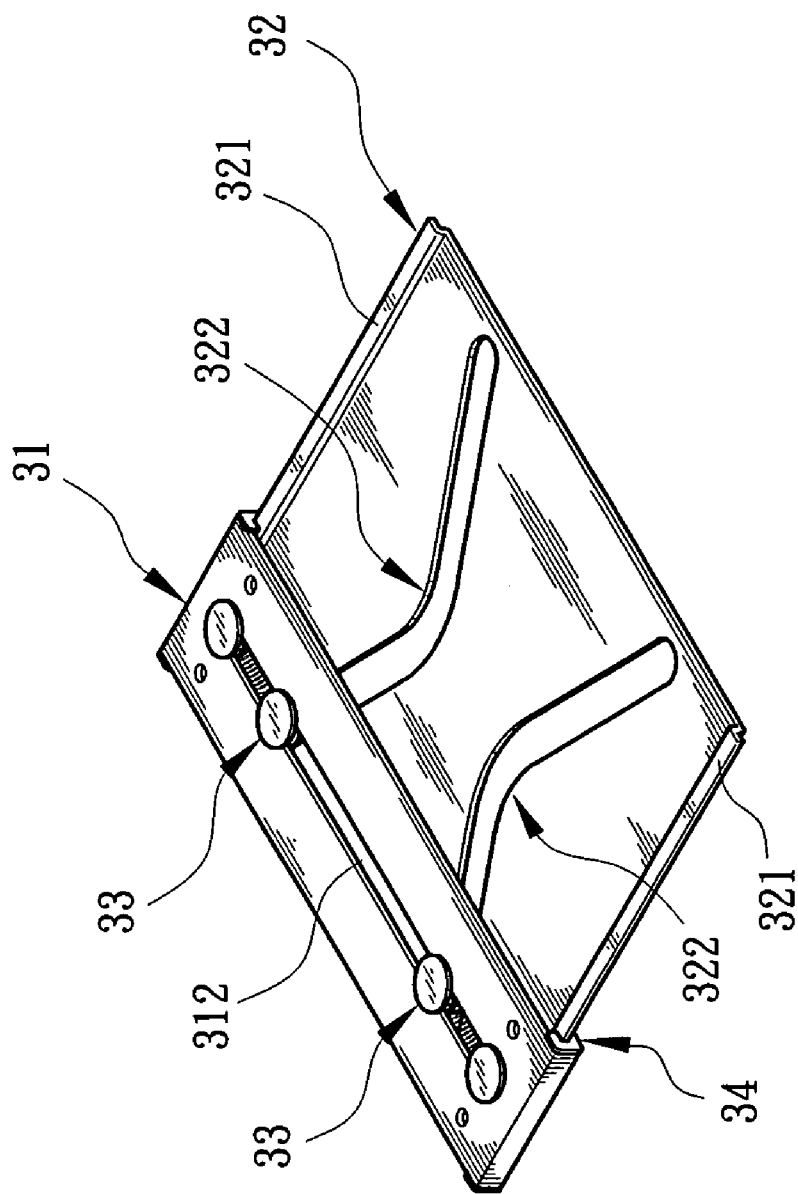
FIG. 9 is a perspective assembled view of the slide cover unit of the present invention.
Figure 10:
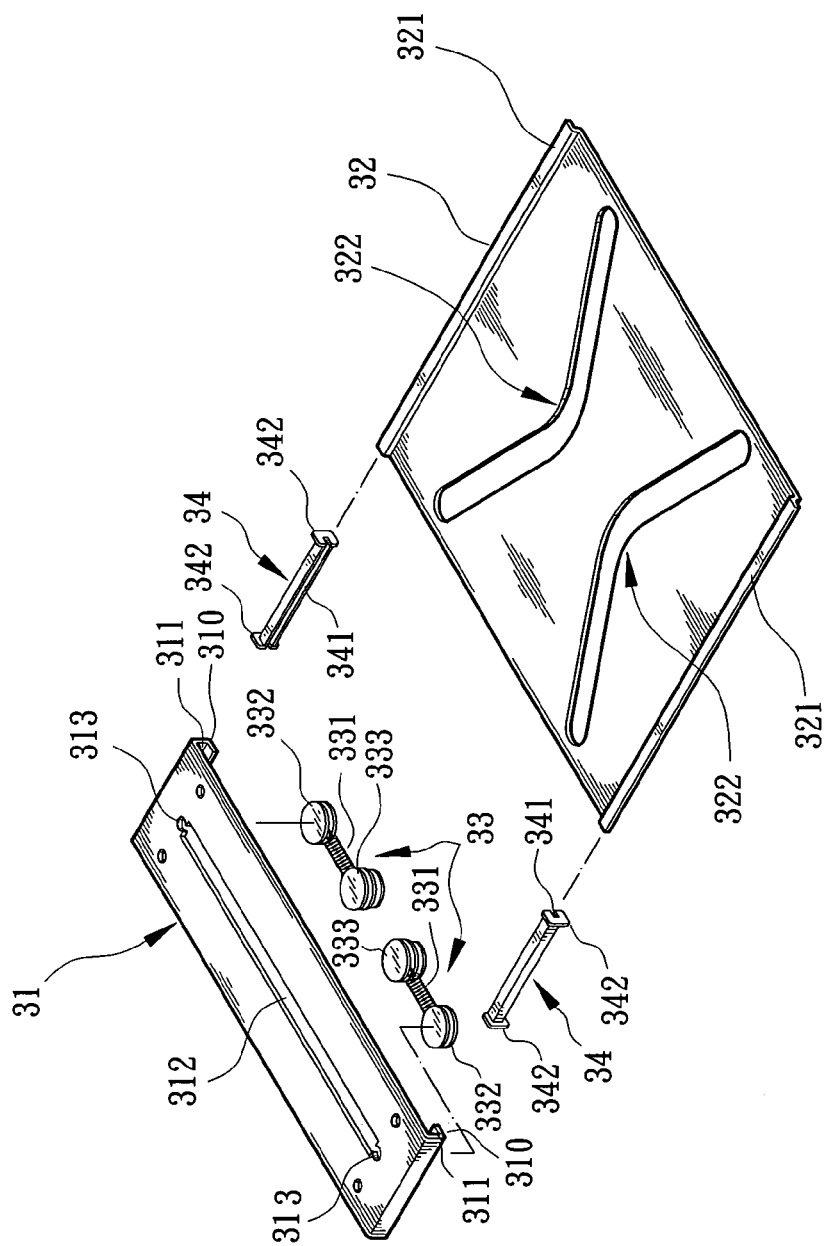
FIG. 10 is a perspective exploded view of the slide cover unit of the present invention.

Please refer to FIGS. 9 and 10. The slide cover unit of the present invention includes an upper cover 31 having two longitudinal slide channels 34 and formed with a transverse slot 312. The slide cover unit further includes at least one resilient member 33. The resilient member has a fixed end 332 fixed at one end of the slot 312 and a free end equipped with a roller member 333. The roller member 333 is inlaid in the slot 312 and slidable to the middle thereof.

The upper cover 31 is substantially U-shaped. Two ends of the upper cover 31 are inward bent to form two bending sections 310. The bending sections 310 define two channels 311 on two sides of the upper cover 31, in which the slide channels 34 are fitted. Two ends of the slot 312 are respectively formed with two notches 313 in which the fixed ends 332 of the resilient members 33 are fixed.

The substrate board 32 is a thin sheet. Two sides of the substrate board 32 are formed with slide rails 321 which can be inlaid in the slide channels 34. Each slide channel 34 is formed with a flute 341 in which the slide rail 321 can be inlaid. Two insertion plates 342 are disposed at two ends of the slide channel 34 for fixing the slide channel 34 in the channel 311 of the upper cover 31. In this embodiment, the substrate board 32 is substantially oppositely formed with two V-shaped guide slots 322. Two ends of each guide slot 322 are biased outward. When the roller members 333 slide within and along the slot 312, the roller members 333 also slide within and along the guide slots 322. The guide slots 322 are reversely bent in different positions, whereby the middles of the guide slots 322 serve as two ridge points 334, 335 which are not aligned with each other. The ridge points 334, 335 define a buffering region X. When the roller members 333 move to the buffering region X in a certain direction, the roller members 333 must at least pass over the relatively distal ridge point 334 or 335 of the buffering region X so that the upper cover 31 can further automatically go on with the sliding travel in the direction to complete the opening/closing operation.

Figures 11, 12:
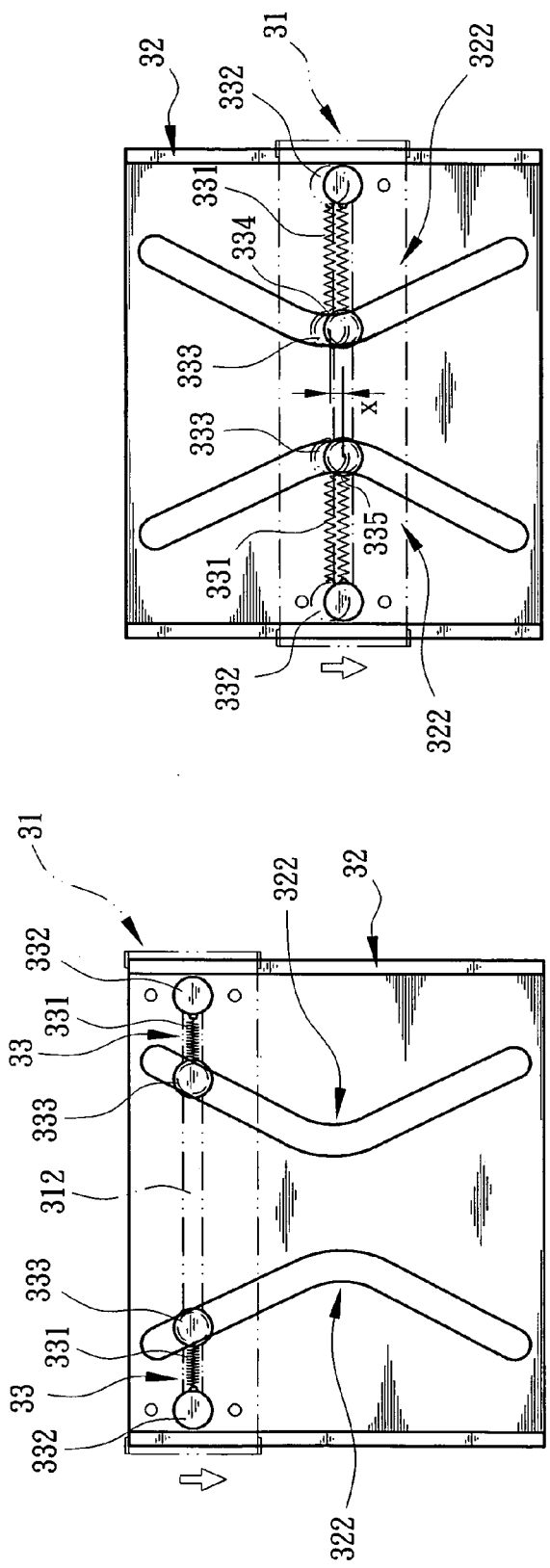
FIG. 11 is a plane view of the slide cover unit of the present invention, in which the upper cover is positioned in its home position.
FIG. 12 is a plane view according to FIG. 11, in which the upper cover is pushed to the ridge points.
Figure 13:
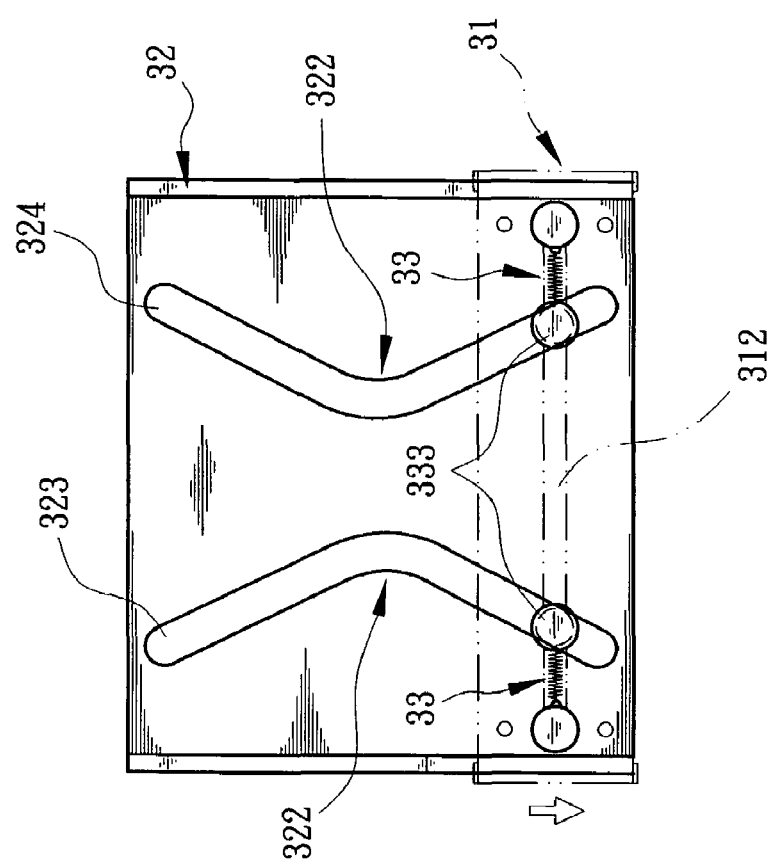
FIG. 13 is a plane view according to FIG. 11, in which the upper cover is pushed to the bottom to complete the sliding travel.

FIGS. 11 to 13 show the path of the roller members 333 along the guide slots 322 of the substrate board 32 when the upper cover is moved between two longitudinal ends of the substrate board 32. When the upper cover 31 is moved to lower side of FIG. 11, the roller members 333 are moved along the guide slots 322 toward the proximal ridge point 334. At this time, the extension springs 331 are extended to exert a pulling force onto the roller members 333 as shown in FIG. 12. When the roller members 333 are moved to the right proximal ridge point 334, the left roller member 333 has not yet reaches the distal ridge point 335, whereby the spring 331 pulling the right roller member 333 still exerts a force onto the upper cover 31 and tends to upward pull back the upper cover 31 in reverse direction. In the case that the upper cover is released from the pushing force at this time, the upper cover 31 will be bounded back to its home position by the reverse pulling force as shown in FIG. 11. Only when the right roller member 333 passes over the right ridge point 334 and the left roller member 333 is very close to the right ridge point 335, the resilient restoring force of the left spring 331 can overcome the extension force of the right spring 331, whereby the upper cover can further automatically move in the predetermined direction to complete the opening/closing operation as shown in FIG. 13. The above procedure can be reversed. This can solve the problem of self-locking of the conventional slide cover in the middle of the travel.

In conclusion, the slide cover unit of the present invention has simplified structure and small volume. Moreover, the components of the slide cover unit of the present invention, such as the slide channels and the roller members can be firmly assembled without easy decomposition due to collision. The ridge points of the two guide slots specifically are not aligned with each other so that the slide cover is not easy to self-lock.

The above embodiments are only used to illustrate the present invention, not intended to limit the scope thereof. Many modifications of the above embodiments can be made without departing from the spirit of the present invention.

What is claimed is:

1. A slide cover unit comprising:
   a substrate board formed with guide slots and slide rails, each guide slot having a middle ridge point;
   an upper cover having slide channels and formed with a transverse slot, the slide rails of the substrate board being slidably inlaid in the slide channels; and
   at least one resilient member having a fixed end fixed at an outer end of the slot, the resilient member further having a free end equipped with a roller member, the roller member being slidably inlaid in the transverse slot and the guide slots, when the upper cover is moved, the roller member being moved along the transverse slot and guide slots to extend or compress the resilient member within the transverse slot, whereby when the roller member passes over the ridge point, by means of the resilient restoring force of the resilient member, the upper cover can further automatically move to complete opening/closing operation.

2. The slide cover unit as claimed in claim 1, wherein two ends of each guide slot are biased outward, whereby the guide slot is substantially V-shaped.

3. The slide cover unit as claimed in claim 2, wherein the guide slots are oppositely reversely bent in different positions, whereby the middle ridge points of the guide slots are closest to each other and are not aligned with each other.

4. The slide cover unit as claimed in claim 1, wherein the upper cover is substantially U-shaped, two sides of the upper cover being inward bent to form two bending sections, the bending sections defining two channels on two sides of the upper cover, in which the slide channels are fitted.

5. The slide cover unit as claimed in claim 2, wherein the upper cover is substantially U-shaped, two sides of the upper cover being inward bent to form two bending sections, the bending sections defining two channels on two sides of the upper cover, in which the slide channels are fitted.

6. The slide cover unit as claimed in claim 3, wherein the upper cover is substantially U-shaped, two sides of the upper cover being inward bent to form two bending sections, the bending sections defining two channels on two sides of the upper cover, in which the slide channels are fitted.

7. The slide cover unit as claimed in claim 4, wherein each slide channel is formed with a flute in which the slide rail is inlaid, an insertion plate being disposed on at least one end of the slide channel for fixing the slide channel in the channel of the upper cover.

8. The slide cover unit as claimed in claim 5, wherein each slide channel is formed with a flute in which the slide rail is inlaid, an insertion plate being disposed on at least one end of the slide channel for fixing the slide channel in the channel of the upper cover.

9. The slide cover unit as claimed in claim 6, wherein each slide channel is formed with a flute in which the slide rail is inlaid, an insertion plate being disposed on at least one end of the slide channel for fixing the slide channel in the channel of the upper cover.

10. The slide cover unit as claimed in claim 1, wherein the slide channel is formed with a flute in which the slide rail is inlaid.

11. The slide cover unit as claimed in claim 2, wherein the slide channel is formed with a flute in which the slide rail is inlaid.

12. The slide cover unit as claimed in claim 3, wherein the slide channel is formed with a flute in which the slide rail is inlaid.

* * * * *